United States Patent
Haverlag et al.

(10) Patent No.: US 12,446,128 B2
(45) Date of Patent: Oct. 14, 2025

(54) PERFORMING VISIBLE LIGHT COMMUNICATION WITH A LIGHTING UNIT

(71) Applicant: SIGNIFY HOLDING B.V., Eindhoven (NL)

(72) Inventors: Marco Haverlag, Mierlo (NL); Marcel Beij, Sint Oedenrode (NL); Berend Jan Willem Ter Weeme, Eindhoven (NL); Eugen Jacob De Mol, Eindhoven (NL); Richard Godefridus Cornelis Van Der Wolf, Eindhoven (NL)

(73) Assignee: SIGNIFY HOLDING B.V., Eindhoven (NL)

(*) Notice: Subject to any disclaimer, the term of this patent is extended or adjusted under 35 U.S.C. 154(b) by 234 days.

(21) Appl. No.: 18/022,770

(22) PCT Filed: Aug. 31, 2021

(86) PCT No.: PCT/EP2021/073940
§ 371 (c)(1),
(2) Date: Feb. 23, 2023

(87) PCT Pub. No.: WO2022/049046
PCT Pub. Date: Mar. 10, 2022

(65) Prior Publication Data
US 2023/0309210 A1 Sep. 28, 2023

(30) Foreign Application Priority Data
Sep. 1, 2020 (EP) .................................... 20193865

(51) Int. Cl.
*H05B 45/00* (2022.01)
*H04B 10/116* (2013.01)
*H05B 45/22* (2020.01)
*H05B 47/10* (2020.01)
*H05B 47/195* (2020.01)

(52) U.S. Cl.
CPC ........... *H05B 47/195* (2020.01); *H05B 45/22* (2020.01)

(58) Field of Classification Search
CPC ........ H05B 45/00; H05B 45/20; H05B 45/46; H05B 47/10; H05B 47/165; H05B 47/195; H05B 39/04; H05B 39/047; H04B 10/116
See application file for complete search history.

(56) References Cited

U.S. PATENT DOCUMENTS

| | | | |
|---|---|---|---|
| 9,900,095 B2 * | 2/2018 | Hong | H04B 10/516 |
| 9,900,963 B1 * | 2/2018 | Doll | H05B 45/30 |
| 10,736,198 B2 * | 8/2020 | Grave | H05B 47/185 |

(Continued)

FOREIGN PATENT DOCUMENTS

| | | | |
|---|---|---|---|
| JP | 2006120910 A | 5/2006 | |
| JP | 2012038937 A | 2/2012 | |

(Continued)

*Primary Examiner* — Thai Pham

(57) ABSTRACT

A mechanism for performing a communication using a visible light communication (VLC) protocol. The mechanism proposes to modulate a bus voltage provided to all lighting elements (comprising LED elements) of a lighting unit, so that the magnitude of light emitted by all lighting elements is modulated according to a same modulation scheme. A lighting system having a plurality of lighting elements is also proposed.

14 Claims, 2 Drawing Sheets

(56) References Cited

U.S. PATENT DOCUMENTS

| | | | |
|---|---|---|---|
| 2007/0171271 A1* | 7/2007 | Wey | H05B 45/20 347/237 |
| 2012/0051757 A1* | 3/2012 | Nishino | H04B 10/1149 398/201 |
| 2013/0063047 A1 | 3/2013 | Veskovic | |
| 2014/0375217 A1* | 12/2014 | Feri | H05B 47/195 315/151 |
| 2015/0115809 A1* | 4/2015 | Siessegger | H05B 45/48 315/291 |
| 2015/0372753 A1* | 12/2015 | Jovicic | H05B 45/12 398/172 |
| 2017/0353240 A1* | 12/2017 | Raj | H04B 10/116 |
| 2019/0110343 A1 | 4/2019 | Van Kaathoven et al. | |
| 2020/0138379 A1 | 5/2020 | Huiku et al. | |
| 2021/0243859 A1* | 8/2021 | DeJonge | H05B 47/16 |

FOREIGN PATENT DOCUMENTS

| | | |
|---|---|---|
| JP | 2013110636 A | 6/2013 |
| JP | 2017139211 A | 8/2017 |
| JP | 2020523752 A | 8/2020 |
| WO | 2016150088 A1 | 9/2016 |

\* cited by examiner

PERFORMING VISIBLE LIGHT COMMUNICATION WITH A LIGHTING UNIT

CROSS-REFERENCE TO PRIOR APPLICATIONS

This application is the U.S. National Phase application under 35 U.S.C. § 371 of International Application No. PCT/EP2021/073940, filed on Aug. 31, 2021, which claims the benefit of European Patent Application No. 20193865.1, filed on Sep. 1, 2020. These applications are hereby incorporated by reference herein.

FIELD OF THE INVENTION

The present invention relates to the field of lighting units, and in particular to the field of visible light communication using lighting units.

BACKGROUND OF THE INVENTION

There is an ongoing trend in the professional lighting industry towards connected lighting systems. Connected lighting systems facilitates a variety of advantageous features like (remote) scheduling, energy monitoring, sensor-based lighting control and asset management. In these connected systems typically a single light source consists of a single light emitting surface in the form of an area light source or a spot light source.

Some of these light sources can be configured to use a visual light communication protocol, in which the light emits light having a specific modulation pattern (unique to each light source). The light having a specific modulation pattern can be detected by a suitable detector (e.g. a camera) to facilitate accurate determination as to the position of the light source, using a database of these light sources and their individual visual light communication codes.

At the same time, there is an ongoing desire to use LED light sources that have a tuneable color, for improved and more flexible visual output. Also light sources that comprise multiple light elements are becoming more common, to create more attractive light patterns in or on the ceiling, which may mimic natural light patterns in the daylight sky, or decorative light patterns.

SUMMARY OF THE INVENTION

The invention is defined by the claims.

According to examples in accordance with an aspect of the invention, there is provided a lighting unit configured for performing a communication according to a visible light communication, VLC, protocol.

The lighting unit comprises:
a voltage supply configured to provide a bus voltage;
at least one lighting element configured to receive the bus voltage for powering one or more LED elements, the at least one lighting element comprising:
the one or more LED elements; and
an LED controller coupled in series with the one or more LED elements, wherein the LED controller configured to control an average current flowing through the one or more LED elements.

The voltage supply further comprises a voltage modulator configured to modulate the bus voltage provided to the one or more lighting elements to thereby control a magnitude of light output by the one or more lighting elements for performing a communication according to a VLC protocol.

Each lighting element can effectively be treated as a pixel of a larger lighting unit.

The present disclosure proposes a mechanism by which multiple separate lighting elements of a same lighting unit can be controlled to provide a same VLC protocol communication. In particular, modulating the bus voltage provides a single control point for providing a VLC communication using the entire lighting unit. This ensures that each lighting element is controlled in the same manner, ensuring uniformity of light output by the lighting unit.

This approach avoids the need to co-ordinate the operation of each LED controller of the lighting element if desiring to perform a VLC communication, which would otherwise increase a complexity and difficulty of performing a VLC protocol communication. In other words, the proposed approach avoids a need to co-ordinate control of all the lighting elements separately.

Optionally, the voltage modulator is configured to modulate the bus voltage between a minimum non-zero voltage and a maximum non-zero voltage. Modulating between two non-zero voltages reduces a flicker effect perceived by an observer of the lighting unit.

The maximum non-zero voltage is preferably no greater than 1.5 times the minimum non-zero voltage. Keeping a low modulation difference between the maximum and minimum non-zero voltage further reduces a flicker effect perceived by an observer of the lighting unit. In some examples, the maximum non-zero voltage is no greater than 1.2 times the minimum non-zero voltage.

Optionally, the voltage modulator is configured to modulate the bus voltage according to a predetermined modulation pattern.

The modulation pattern may match a desired communication to be made according to a VLC protocol, e.g. a communication that provides a unique identifier for the lighting unit. Thus, the predetermined modulation pattern may provide a unique identifier for the lighting unit. A "unique" identifier may be any suitable identifier that facilitates identification of the lighting unit that emits light modulated according to the predetermined modulation pattern. A "unique" identifier may be unique within the context of a lighting system in which the lighting unit is placed.

Other suitable communication according to a VLC protocol will be apparent to the skilled person, e.g. a communication that provides other (state) information about the lighting unit, e.g. providing electrical measurements of the lighting unit or measurements sensed by one or more sensors connected to the lighting unit.

In some examples, the one or more LED elements, of each lighting element, comprises two or more sets of one or more LED elements; and the LED controller, of each lighting element, is configured to separately control the average current flowing through each set of one or more LEDs elements.

Optionally, for each lighting element, each set of one or more LED elements is configured to emit light of a different color.

In this way, the lighting unit is able to change the effective color emitted by each lighting element (i.e. a pixel color). In some examples, the two or more sets comprises only two sets, each adapted to output light of a different color temperature to facilitate tuning of color temperature. Optionally, the two or more sets comprises at least three sets, each set emitting light of a different color (e.g.: red, green, blue or colors for an alternative color space).

The proposed mechanism, of modulating a bus voltage of a lighting unit, means that (within a single LED element) the ratio of currents between the different sets of LED elements does not significantly change (assuming the voltage drop across each LED is roughly the same). This means that the color of light output by a lighting element will not undergo a substantial change during a VLC protocol communication.

This effect is particularly pronounced if the bus voltage is modulated between a minimum non-zero voltage and a maximum non-zero voltage. The effect is even more pronounced if the maximum non-zero voltage is no greater than 1.5 times the minimum non-zero voltage and even more pronounced if the maximum non-zero voltage is no greater than 1.2 times the minimum non-zero voltage.

In some embodiments, the LED controller, of each lighting element, is configured to receive a control signal from a central controller and control the average current flowing through the one or more LED elements responsive to the control signal.

The voltage supply may comprise a transformer configured to transform a mains supply voltage to the bus voltage.

There is also proposed a lighting system comprising one or more lighting units as herein described.

The voltage modulator of each lighting unit in the lighting system may be configured to modulate the bus voltage according to a different predetermined modulation pattern.

The lighting system may further comprise a central controller configured to provide a control signal to each LED controller of each LED element.

The lighting system may further comprise a light detection module configured to: detect light emitted by each of the one or more lighting units; and discriminate between different lighting units based on the light emitted by each of the one or more lighting units.

The light detection module may be configured to discriminate between different lighting units by monitoring for a communication according to a VLC protocol in light emitted by each of the one or more lighting units.

There is also proposed a method for performing a communication according to a visible light communication, VLC, protocol using a lighting unit having a one or more lighting elements, each comprising one or more LED elements, wherein each lighting element: is configured to receive a bus voltage for powering the one or more LED elements; and comprises an LED controller configured to control a current flowing through the one or more LED elements.

The method comprises modulating the bus voltage provided to the one or more lighting elements to control a magnitude of light output by the one or more lighting elements for performing a communication according to a VLC protocol.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
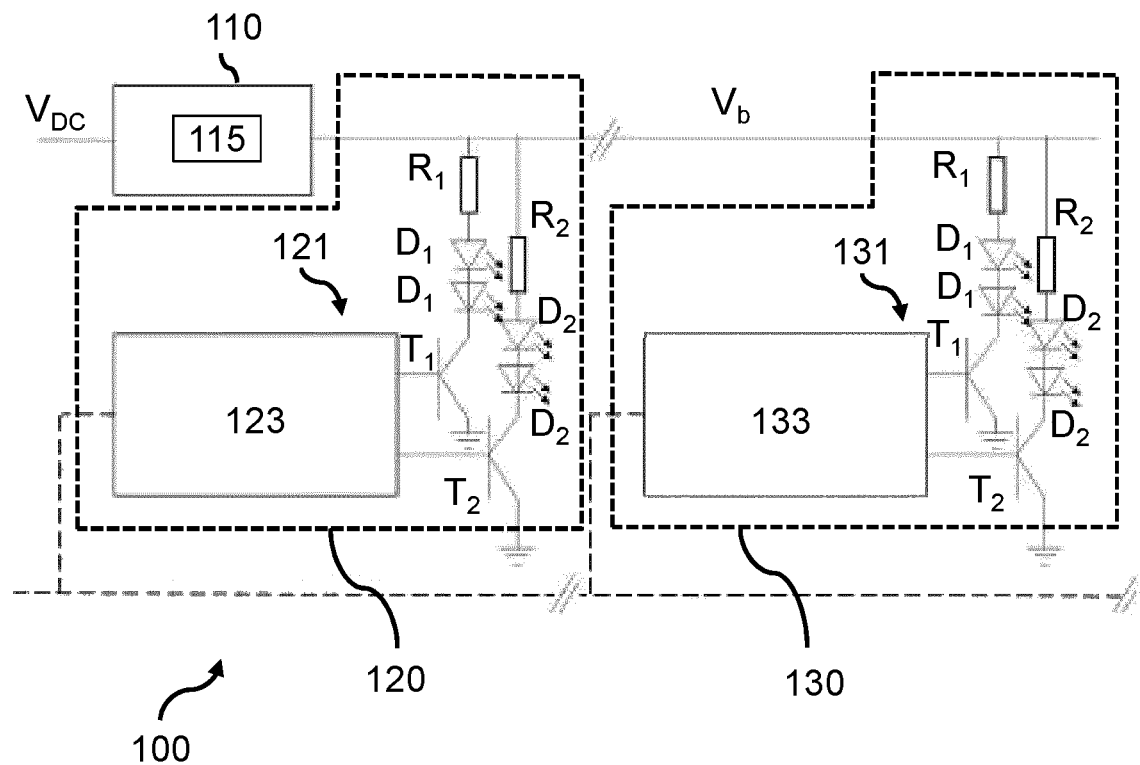
FIG. 1 illustrates a lighting unit according to an embodiment.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a mechanism for performing a communication using a visible light communication (VLC) protocol. The mechanism proposes to modulate a bus voltage provided to all lighting elements (comprising LED elements) of a lighting unit, so that the magnitude of light emitted by all lighting elements is modulated according to a same modulation scheme. A lighting system having a plurality of lighting elements is also proposed.

The present disclosure is based on the realization that a lighting unit, having lighting elements that are separately controllable, can be configured so that all lighting elements have a same modulation in output light by modulating the common bus or supply voltage provided to each lighting element. This ensures a consistent modulation to light output by each lighting element.

Embodiments of the invention can be employed in any suitable lighting system, such as any indoor/outdoor lighting system such as those employed in offices, as well as in healthcare, industry, retail and hospitality environments. Embodiments are particular advantageous when employed in connected lighting systems.

FIG. 1 illustrates a lighting unit 100 according to an embodiment of the invention.

The lighting unit 100 comprises a voltage supply 110. The voltage supply is configured to generate a (DC) bus voltage $V_b$.

As an example, the voltage supply may be directly connected to a mains voltage and be configured to convert the mains supply voltage to the bus voltage, e.g. using one or more transformers, rectifiers, drivers and so on. As another example, the voltage supply 110 may receive a pre-processed voltage supply, e.g. from an electromagnetic ballast or driver, and further process the pre-processed voltage supply to generate the bus voltage $V_b$.

The lighting unit 100 also comprises at least one or more lighting elements 120, 130. In the illustrated example, the lighting unit comprises a plurality of lighting elements 120, 130, but any number of lighting elements may be used.

Each lighting element 120, 130 comprises one or more LED elements $D_1$, $D_2$. Each lighting element 120, 130 is configured to receive the bus voltage $V_b$ for powering the LED element(s) of the lighting element.

The average current through the LED elements is controlled by an LED controller 121, 131. The LED controller 121, 131 is coupled in series with at least one of the one or more the LED elements. It is well understood that the average current through an LED element defines the average brightness of light output by the LED element, so that the LED controller 121, 131 is able to control the (average) brightness of light output by the LED element(s).

In the illustrated example, each LED controller 121, 131 is adapted to control current flow by controlling, using a control module 123, 133 (e.g. microprocessor, ASIC, FPGA or the like), whether or not current is able to flow through the LED elements $D_1$, $D_2$ using switches $T_1$, $T_2$, such as a transistor (e.g. a BJT or a MOSFET). In an alternative approach, the switches could be replaced by variable resistors which facilitate control of a magnitude of average current through the LED elements. In another approach, the switches could be replaced by switched current sources in order to facilitate direct control of current through the LED elements.

The LED elements $D_1$, $D_2$ are arranged in one or more sets of one or more LED elements. Each set of one or more LED elements may comprise a string of LED elements, as illustrated. In the illustrated example, each lighting element comprises only two sets of LED elements, however envisaged embodiments may include any number of LED elements.

Preferably, different sets of one or more LED elements are configured to have different properties. As an example, different sets of one or more LED elements may be configured to output light of different colors, e.g. a first set of one or more LED elements may emit light of a first color, with a second set being configured to emit light of a second, different color (and optionally a third set being configured to emit light of a third, different color). Of course, any number of sets is envisaged, e.g. further including a fourth set or a fifth set, each configured to emit light of a different color.

The different colors may, for example, have different color temperatures. For instance, a first set of one or more LED elements may emit light of a first color temperature, and a second set of one or more LED elements may emit light of a second color temperature.

This approach can be achieved through use of different types of LED elements for different sets of one or more LED elements. Thus, different sets comprise different types of LED elements. For instance, a first set of one or more LED elements may comprise only LED elements (or only an LED element) configured to emit light of a first color when current flows through the LED element(s). Similarly, a second set of one or more LED elements may comprise only LED elements (or only an LED element) configured to emit light of a second color when current flows through the LED element(s).

The LED controller is configured to control a current flow through each set of LED elements, e.g. so that a current flow through each LED element in a particular set of LED elements is controlled in an identical manner. Each set of LED elements may have a dedicated current (flow) control mechanism, such as a switch, variable resistor or switched current source, to facilitate control current flow through the set of LED elements.

As an example, the current flow through a first set of LED elements $D_1$ may be controlled using a first switch $T_1$. Similarly, the current flow through a second set of LED elements $D_2$ may be controlled using a second switch $T_2$.

As another example, the (average) current through a first set of LED elements $D_1$ may be controlled using a switched current source or a variable resistor. Similarly, the (average) current through the second set of LED elements $D_2$ may be controlled using another switched current source or a variable resistor.

It will be appreciated that the precise mechanism for controlling (average) current flow through LED elements of a lighting element may differ for different embodiments of a lighting unit and/or within a same lighting unit. For example, a first current control mechanism (e.g. switches) could be used to control the (average) current through LED elements of the first lighting element 120 and a second, different current control mechanism (e.g. switched current sources) could be used to control the (average) current through LED elements of a second lighting element 130.

It is also possible for different mechanisms for controlling (average) current flow through the LED elements to be implemented within a same lighting element 120, 130. For instance, the average current through a first set of LED elements $D_1$ may be controlled using a first current control mechanism and the average current through the second set of LED elements $D_2$ may be controlled using a second, different current control mechanism.

Controlling the average current through the LED elements facilitates control over the (average) brightness of light emitted by the LED elements.

If each set of one or more LED elements is configured to emit light of a different color, controlling the brightness of light emitted by each set of LED elements enables an overall color of light emitted by each lighting element to be controlled. This may be performed according to well-known RGB principles or other color calculation principles, such as the XYZ color coordinate system. Thus, a color of light output by the lighting element can be controlled—so that a lighting element can be effectively treated as a "pixel" of the overall lighting unit.

As previously explained, in the illustrated example, the average current is controlled by controlling a current flow through the LED elements using the LED controller 121, 131. The current flow may be controlled according to a pulse width modulation method (although other modulation methods are contemplated, such as binary code modulation) to facilitate control over the average current flowing through the LED element(s).

In some examples, the LED controller, of each lighting element, is configured to receive a control signal from a central controller and control the average current flowing through the one or more LED elements responsive to the control signal. Thus, the operation of the LED controller(s) may be responsive to an external signal.

Each lighting element 120, 130 may further comprise one or more resistive elements $R_1$, $R_2$ for defining a maximum value/magnitude for the current through the LED elements. The resistive elements may be replaced by a voltage controlled current source or a current source, as would be readily appreciated by the skilled person.

The resistive elements could be omitted if, for example, current flow through the one or more LED elements is controlled using a switched current source or a variable resistor (rather than switches $T_1$, $T_2$ as illustrated), as these elements can themselves define the maximum value for the current through the LED elements.

The present disclosure relates to a new mechanism for controlling the operation of the lighting unit in order to perform a communication according to a visible light communication protocol.

Although existing control mechanisms could be used in order to perform a communication according to a visible light communication protocol (e.g. controlling the amount of light emitted by each LED element using the LED controller), this requires correct and complex co-ordination of the operation of each LED controller, to ensure that all lighting elements 120, 130 (and LED elements of the same) vary in brightness simultaneously. This requirement is necessary and is required to ensure correct sending of the communication according to the visible light communication protocol, and significantly increases a difficulty in operating the LED controller(s).

The present invention instead proposes the concept of a modulating a bus voltage provided to all lighting elements and LED elements. Thus, a common supply shared by all lighting elements and LED elements is modulated simultaneously, so that lighting elements (and LED elements of the same) vary in brightness simultaneously.

Thus, rather, then requiring complex control of a potentially large number of LED controllers and control mechanisms (e.g. switches, variable resistors or the like), it is proposed to perform modulation using a single, shared controller in the voltage supply 110 of the lighting unit 100.

Thus, the voltage supply comprises a voltage modulator 115 configured to modulate the bus voltage $V_b$ provided to the one or more lighting elements 120, 130 to thereby control a magnitude of light output by the one or more lighting elements for performing a communication according to a VLC protocol.

In particular, a modulation pattern of the bus voltage may be dependent upon a desired VLC protocol communication that is to be sent by the lighting unit. This may, for example, include a modulation pattern that provides a unique identifier for the lighting unit.

A "unique" identifier may be any suitable identifier that facilitates identification of the lighting unit that emits light modulated according to the predetermined modulation pattern. This may be used, for example, by a suitable detector (e.g. a mobile phone camera) to accurately determine the position of the detector, using a database of these light sources and their individual visual light communication codes (and already knowing the position of the light).

A "unique" identifier may be unique within the context of a lighting system in which the lighting unit is placed.

As another example, a communication according to a VLC protocol may be a communication that provides an indication of at least one capability of the lighting unit in the form of at least one of an illumination feature or illumination requirement of the lighting unit in a larger lighting system. Examples of this approach are provided in the International Patent Application having publication number WO 2019/007802 A1.

Other suitable communication according to a VLC protocol will be apparent to the skilled person, e.g. a communication that provides other (state) information about the lighting unit, e.g. providing electrical/heat measurements of the lighting unit or measurements sensed by one or more sensors connected to the lighting unit.

Put another way, each lighting unit may be configured to embed a signal into the illumination it emits. This signal preferably comprises at least a unique identifier (ID) of the respective lighting device. The signal may also/otherwise include an indication of one or more application capabilities and/or parameters of the respective lighting unit or connected sensors.

The operation of the voltage modulator 115 may be responsive to a VLC control signal. This can facilitate identification of the lighting unit, as previously described. The VLC control signal may be responsive, for example, to a communication from a central controller (of a larger lighting system) or from a module of or in communication with the particular lighting unit (e.g. a sensor, such as a motion sensor, adapted to use the lighting unit as a means of communication).

In particular examples, the modulation pattern of the voltage modulator may be determined by the voltage modulator (e.g. responsive to a VLC control signal), and the bus voltage may be controlled/modulated accordingly.

To reduce the flicker effect that may result from modulating a bus voltage, preferably, the bus voltage is modulated between two non-zero voltage levels. That is, the voltage modulator may be configured to modulate the bus voltage between a minimum non-zero voltage and a maximum non-zero voltage.

To further reduce the flicker effect, it is preferable that the non-zero voltage levels do not differ significantly.

In some examples, the non-zero voltage levels may differ so that the intensity of light output by the lighting unit changes by no more than 20% or no more than 10% or by no more than 5%.

By way of working example only, using the illustrated circuit, consider a scenario in which the average bus voltage is 48 V, the voltage drop across a set of LED elements is 24V (and each LED element is assumed to have negligible resistance) and the resistance of each resistor may be 120Ω. A variation of 1.2V (±0.6V) in the bus voltage, controlled by the voltage modulator, will result in 5% light output variation (assuming that change in light output intensity/flux is directly proportional to (average) current through an LED element).

In some examples, the non-zero voltage levels may differ by no more than ±20% (of and from an average voltage level), and more preferably no more than ±10% (of and from an average voltage level), and even more preferably by no more than ±5%. As one example, the maximum non-zero voltage may be no greater than 1.5 times the minimum non-zero voltage. As another example, the maximum non-zero voltage may be no greater than 1.2 times the minimum non-zero voltage.

The approach of modulating between two non-zero voltage levels is particularly advantageous when each lighting element comprises two or more sets of (different types) of LED elements. There is a particular advantage if each set of one or more LED elements is configured to emit a different color.

In particular, different types of LED elements (e.g. different colors) will respond differently to a change in the voltage provided across the LED element. By using non-zero voltage levels (and particularly non-zero voltage levels that do not differ significantly), the ratio of the currents between the sets of LED elements does not change significantly, so that the color point of light output by a lighting element will not change substantially whilst the bus voltage is being modulated.

It will be apparent that the voltage modulator does not need to continuously modulate the bus voltage. Rather, the voltage modulator may be configured to only modulate the bus voltage when there is a desire to send a VLC protocol communication, e.g. in response to a control signal or the like.

In some examples, the voltage modulator may default to a predetermined modulation pattern, but use a different modulation pattern in response to a control signal (e.g. requesting specific information about the lighting unit, such as measurements about certain parameters of the lighting unit, e.g. temperature, power drawn, errors etc.). The predetermined modulation pattern may be a (unique) identifier of the lighting unit, which may be defined and/or modified by an external control signal.

Figure 2:
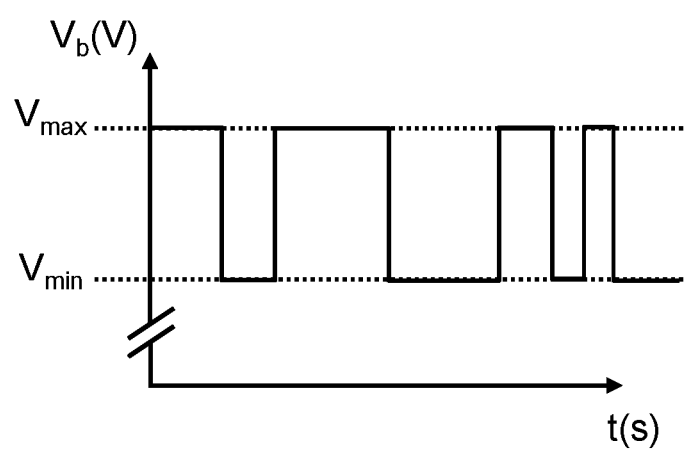
FIG. 2 is a graph illustrating a bus voltage modulated according to an embodiment.

FIG. 2 is a graph 200 that conceptually illustrates a bus voltage $V_b$ undergoing modulation according to an embodiment of the invention.

The bus voltage $V_b$ is modulated to alternate between a maximum voltage level $V_{max}$ and a minimum voltage level $V_{min}$. Preferably, and as illustrated, the maximum $V_{max}$ and minimum $V_{min}$, are non-zero.

As previously explained, the modulation pattern (i.e. the decision as to whether to output the maximum voltage level or the minimum voltage level as the bus voltage) is dependent upon the desired VLC protocol communication that is to be sent.

Figure 3:
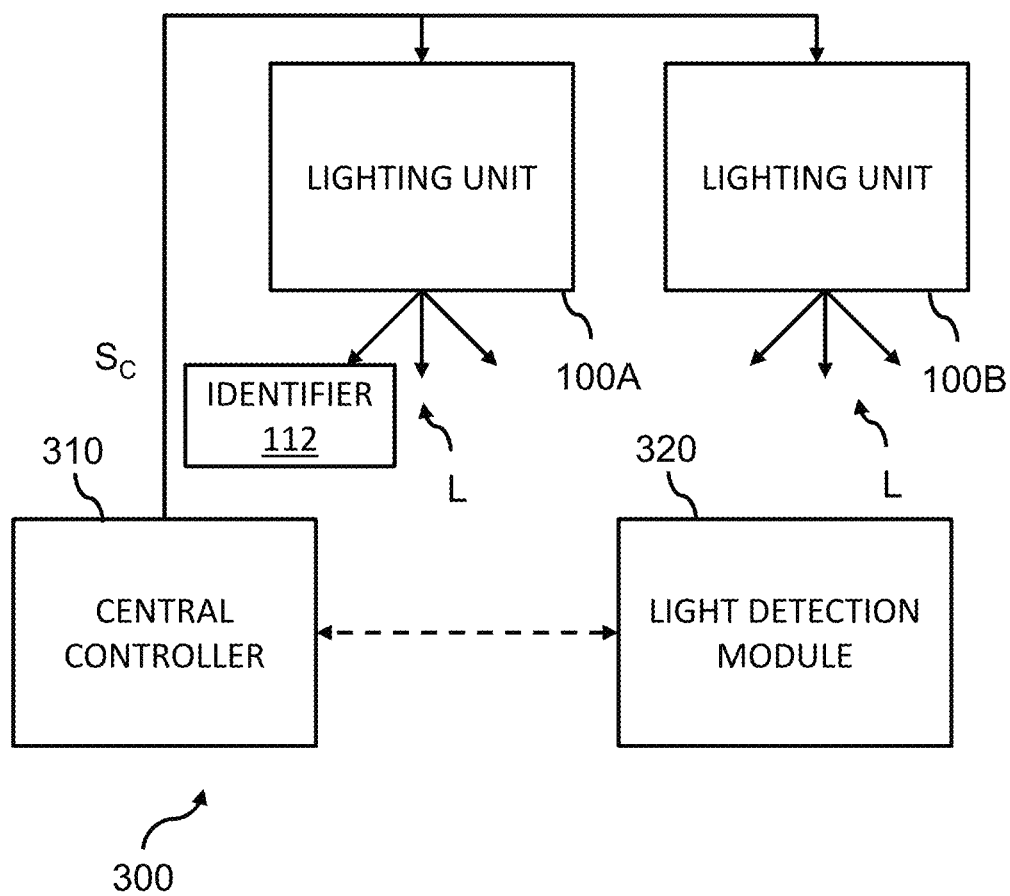
FIG. 3 illustrates a lighting system.

FIG. 3 illustrates a lighting system 300, having a plurality of lighting units 100A, 100B, according to an embodiment. The lighting units may be embodied as previously described, e.g. with reference to FIGS. 1 and 2.

The lighting system 300 may further comprise a central controller 310.

The central controller 310 may be configured to control light L output by each lighting unit 100A, 100B. In particular, the central controller may control or define the operation of the LED controller(s) of each lighting unit.

The central controller 310 may be configured to provide one or more control signals Sc for controlling the operation of the voltage modulator of each lighting unit, e.g. triggering a modulation process performed by the voltage modulator of each lighting unit. This may comprise a single control signal passed to all lighting units, separate control signals for each lighting unit and/or separate control signals for each set of two or more sets of lighting units.

The central controller 310 may also control the average current flowing through the one or more LED elements using the control signal.

The central controller 310 may communicate with each lighting unit 100A, 100B using any suitable wired or wireless communication protocol. Suitable wireless communication protocols that may be used include an infrared link, Zigbee, Bluetooth, a wireless local area network protocol such as in accordance with the IEEE 802.11 standards, a 2G, 3G or 4G telecommunication protocol, and so on. Other formats will be readily apparent to the person skilled in the art.

The central controller 310 may, in some examples, be configured to modify the "unique identifier" of each lighting unit, e.g. to provide each lighting unit with a unique identifier.

The lighting system 300 may further comprise a light detection module 320. The light detection module is configured to identify light L emitted by each lighting unit 100A, 100B and process received light to identify any VLC protocol communications (in the light emitted by each lighting unit 100A, 100B).

In particular, the light detection module 320 may detect light L emitted by each of the one or more lighting units 100A, 100B; and discriminate between different lighting units based on the light emitted by each of the one or more lighting units. This can be performed by identifying a unique identifier in the light emitted by each one or more lighting units and correlating the unique identifier to a particular lighting unit (e.g. using a look-up table or the like).

Information received from the light sources by the light detection module can be used for various purposes, a couple of examples of which are set out below.

The light detection module 320 may be configured to identify its own location based on a VLC protocol communication provided by each lighting unit. This can be performed by processing received light (e.g. at a camera of the light detection unit) to identify a unique identifier within each VLC protocol communication that identifies the lighting unit, and identifying the relative position of the lighting unit based on the detected light. This information can be used to triangulate the position of the light detection module. Suitable approaches for determining the position of a light detection module based on VLC protocol communications from lighting units are set out in the International Patent Applications having publication numbers WO 2017/125338 A1 and WO 2018/099779 A1, amongst others.

Another use for the light detection module 320 may be in the control of commissioning of a light source, e.g. as set out in the International Patent Application having publication number WO 2019/007802 A1.

The central controller 310 and the light detection module 320 may be configured to communicate with one another to control the operation of the lighting units. For instance, the central controller may receive information about the lighting units via VLC protocol messages identified by the light detection module (e.g. their capabilities or parameters), and control the lighting units appropriately.

Figure 4:
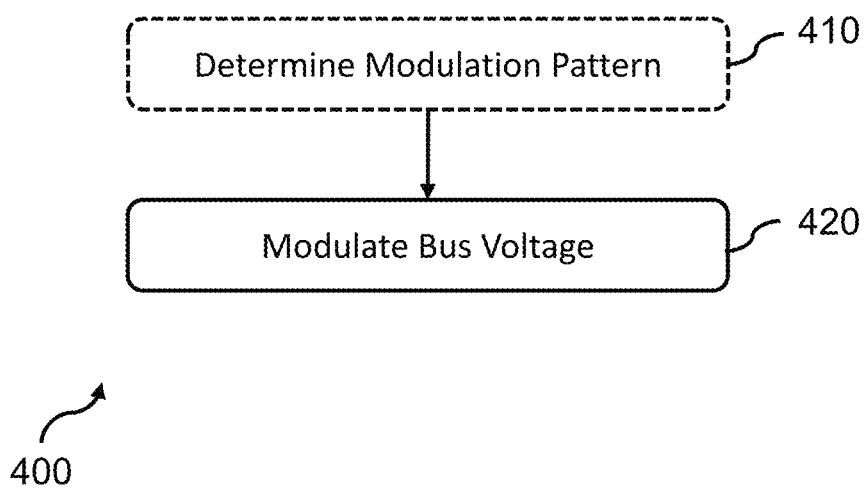
FIG. 4 is a flowchart illustrating a method according to an embodiment.

FIG. 4 illustrates a method 400 for performing a communication according to a visible light communication, VLC, protocol using a lighting unit, according to an embodiment.

The method is for performing a communication according to a visible light communication, VLC, protocol using a lighting unit having a one or more lighting elements, each comprising one or more LED elements, wherein each lighting element: is configured to receive a bus voltage for powering the one or more LED elements; and comprises an LED controller configured to control a current flowing through the one or more LED elements.

The method comprises an optional step 410 of determining a modulation pattern for the bus voltage. This may comprise receiving a control signal and determining the modulation pattern based on the control signal. Alternatively, step 410 may comprise obtaining a stored modulation pattern.

The method comprises a step 420 of modulating the bus voltage provided to the one or more lighting elements to control a magnitude of light output by the one or more lighting elements for performing a communication according to a VLC protocol. The modulation performed in step 420 may follow the modulation pattern obtained in step 410.

The present disclosure relates to concepts in which a bus voltage is modulated between only two voltage levels, a maximum voltage level and a minimum voltage level. This is to follow standard, existing VLC protocols. However, it is contemplated that the bus voltage may be modulated between more than two (preferably non-zero) voltage levels, if a VLC protocol makes use of more than two voltage levels.

Thus, the voltage modulator may modulate the bus voltage between at least minimum non-zero voltage and a maximum non-zero voltage, and may optionally modulate the bus voltage between one or more further voltage levels (if required/desired by the VLC protocol), which are preferably non-zero.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims.

The mere fact that certain measures are recited in mutually different dependent claims does not indicate that a combination of these measures cannot be used to advantage. If the term "adapted to" is used in the claims or description, it is noted the term "adapted to" is intended to be equivalent to the term "configured to". Any reference signs in the claims should not be construed as limiting the scope.

The invention claimed is:

1. A lighting unit configured for performing a communication according to a visible light communication (VLC) control signal, the lighting unit comprising:
   a voltage supply configured to provide a bus voltage;
   at least one lighting element configured to receive the bus voltage for powering one or more LED elements, the at least one lighting element comprising:
      the one or more LED elements; and
      an LED controller coupled in series with the one or more LED elements, wherein the LED controller is configured to control an average current flowing through the one or more LED elements,
      wherein the voltage supply further comprises a voltage modulator configured to modulate the bus voltage provided to the one or more lighting elements to thereby control a magnitude of light output by the one or more lighting elements for performing the communication according to the VLC control signal received by the voltage modulator, and wherein the voltage modulator is configured to modulate the bus voltage according to a modulation pattern of the light output and the modulation pattern includes a unique identifier corresponding to the lighting unit.

2. The lighting unit of claim 1, wherein the voltage modulator is configured to modulate the bus voltage between a minimum non-zero voltage and a maximum non-zero voltage.

3. The lighting unit of claim 2, wherein the maximum non-zero voltage is no greater than 1.5 times the minimum non-zero voltage.

4. The lighting unit of claim 3, wherein the maximum non-zero voltage is no greater than 1.2 times the minimum non-zero voltage.

5. The lighting unit of claim 1, wherein:
   the one or more LED elements, of each lighting element, comprises two or more sets of one or more LED elements; and
   the LED controller, of each lighting element, is configured to separately control the average current flowing through each set of one or more LEDs elements.

6. The lighting unit of claim 5, wherein, for each lighting element, each set of one or more LED elements is configured to emit light of a different color.

7. The lighting unit of claim 1, wherein the LED controller, of each lighting element, is configured to receive a control signal from a central controller and control the average current flowing through the one or more LED elements responsive to the control signal.

8. The lighting unit of claim 1 wherein the voltage supply comprises a transformer configured to transform a mains supply voltage to the bus voltage.

9. A lighting system comprising one or more lighting units according to claim 1.

10. The lighting system of claim 9, where the voltage modulator of each lighting unit is configured to modulate the bus voltage according to a different predetermined modulation pattern.

11. The lighting system of claim 9, further comprising a central controller configured to provide a control signal to each LED controller of each LED element.

12. The lighting system of claim 9, further comprising a light detection module configured to:
    detect light emitted by each of the one or more lighting units; and
    discriminate between different lighting units based on the light emitted by each of the one or more lighting units.

13. The lighting system of claim 12, wherein the light detection module is configured to discriminate between different lighting units by monitoring for a communication according to a VLC protocol in light emitted by each of the one or more lighting units.

14. A method for performing a communication according to a visible light communication (VLC) control signal using a lighting unit having a one or more lighting elements, each comprising one or more LED elements, wherein each lighting element: is configured to receive a bus voltage for powering the one or more LED elements; and comprises an LED controller coupled in series with the one or more LED elements and configured to control a current flowing through the one or more LED elements,
    wherein the method comprises modulating the bus voltage provided to the one or more lighting elements to control a magnitude of light output by the one or more lighting elements for performing the communication according to the VLC control signal received by the voltage modulator, and wherein the voltage modulator is configured to modulate the bus voltage according to a modulation pattern of the light output and the modulation pattern includes a unique identifier corresponding to the lighting unit.

* * * * *